H. K. THOMAS.
MOTOR VEHICLE.
APPLICATION FILED APR. 24, 1911.
1,201,693.
Patented Oct. 17, 1916.
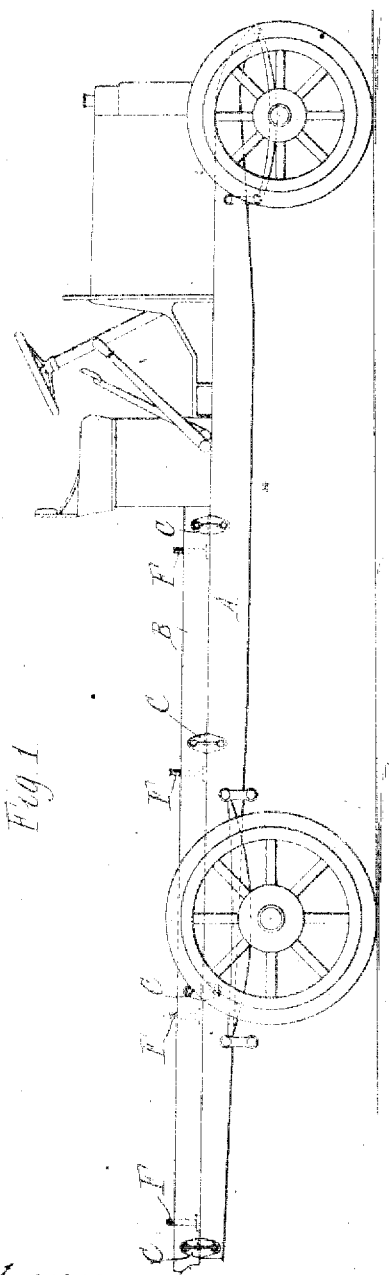
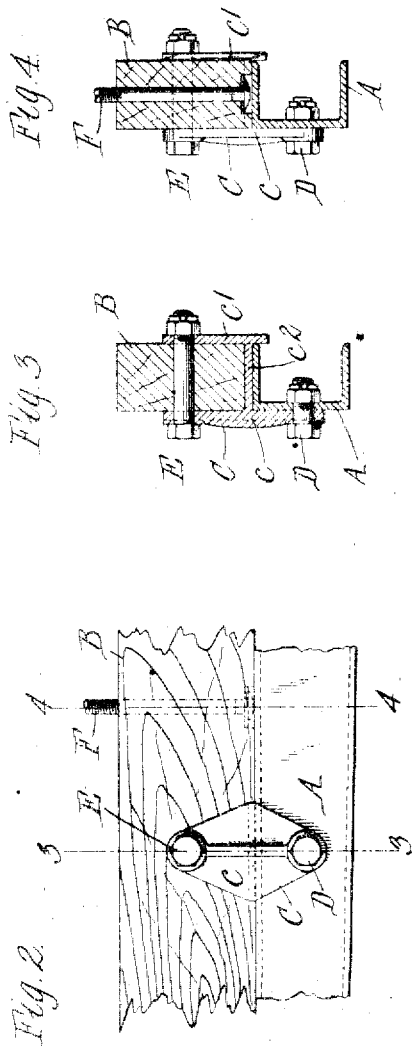
Witnesses
Inventor
Hugh Kerr Thomas
Wilhelm Parker And
Attorneys.

UNITED STATES PATENT OFFICE.

HUGH KERR THOMAS, OF BUFFALO, NEW YORK, ASSIGNOR TO THE PIERCE-ARROW MOTOR CAR COMPANY, OF BUFFALO, NEW YORK.

MOTOR-VEHICLE.

1,201,893.

Specification of Letters Patent. Patented Oct. 17, 1916.

Application filed April 24, 1911. Serial No. 622,894.

*To all whom it may concern:*

Be it known that I, HUGH KERR THOMAS, a subject of the King of Great Britain, residing at Buffalo, in the county of Erie and State of New York, have invented a new and useful Improvement in Motor-Vehicles, of which the following is a specification.

This invention relates to motor vehicles, and more particularly to the means employed in commercial vehicles, such as motor trucks, wagons and the like, for securing the bodies on the metal supporting frames.

Heretofore, in vehicles in which the side members of the frame are formed by metal beams having horizontal flanges it has been customary to secure the body directly thereto by vertical bolts passing through the upper flanges of the beams. This construction is objectionable for several reasons. The bolt holes weaken the beams, as the upper flanges constitute the compression members thereof. As the flanges are relatively thin, the bolts have only a short bearing therein and the strains incident to the lateral swaying or wrenching of the body must be resisted principally by the heads of the bolts. The thin flanges are also liable to be twisted or bent out of their original shape by the strains thereon. Furthermore, the construction of the metal frame and the arrangement and construction of the driving mechanism or other parts mounted thereon often necessitate the location of the bolts at points which are not suitable or desirable for securing bodies of some constructions.

The object of this invention is to overcome these objections and provide a construction which insures a rigid and secure attachment of the body to the frame; in which the side members or beams of the frame are not weakened by the holes for the securing bolts; and which enables the body securing bolts to be located at whatever points along the side beams are most suitable for securing the body, depending upon the construction thereof. This object is attained by fastening wooden sills on the metal side beams or members of the frame in a novel manner and securing the body of the frame by vertical bolts passing through these sills.

In the accompanying drawings: Figure 1 is a side elevation of a portion of a motor vehicle provided with body securing means embodying the invention. Fig. 2 is a fragmentary side elevation of the frame, on an enlarged scale. Fig. 3 is a cross-section thereof in line 3—3, Fig. 2. Fig. 4 is a cross-section thereof in line 4—4, Fig. 2.

Like reference characters refer to like parts in the several figures.

A represents one of the side members of the metal supporting frame of the vehicle, and B represents a sill, preferably of hard wood, which is secured on the upper face of the beam or member A. The side member A shown is a pressed steel beam of U-shape, such as commonly used, being arranged with its web vertically and its flanges projecting horizontally inward. The invention is, however, adapted for use with other forms of side beams having horizontal top flanges or portions affording supporting surfaces for the wooden sills.

The sill B is rigidly secured on the side beam by metal brackets C which are bolted to the sill and to the vertical web of the beam. Each of these brackets is preferably of the form clearly shown in Figs. 2 and 3, having upright outer and inner plates or pieces $c$ $c'$ connected by a horizontal cross piece $c^2$. The cross piece $c^2$ rests on the upper face of the beam A and the outer plate $c$ depends beside the vertical web of the beam to which it is rigidly secured by a bolt D, rivet or other fastening device. The inner plate $c'$ of the bracket also preferably projects somewhat below the cross piece so as to engage the inner edge of the top flange of the beam. The bracket thus straddles or embraces the upper portion of the side beam A so that it is prevented from shifting laterally thereon and the securing bolt D is relieved to a considerable extent from lateral strains. The upright plates $c$ $c'$ of the bracket embrace the wooden sill B which is secured between them by a horizontal bolt E, the lower edge of the sill being mortised to receive the cross piece $c^2$ of the bracket so that the sill rests flat upon the upper face of the side beam. The wooden sill B is thus rigidly and securely fastened on the side beam and the bolts D pass through the vertical web of the beam substantially in its neutral axis so that the beam is not weakened by the bolt holes.

The body of the vehicle (not shown) is secured on the wooden sills B by vertical bolts F passing through the sills. These bolts extend through the wooden sills only and not through the upper flanges of the side beams. Therefore, the beams are not weakened by bolt holes in their upper flanges or compression members. The attachment of the body is much more rigid when secured in this manner than when bolted to the upper flanges of the beams, as the latter are relatively thin and liable to be bent or twisted by the strains due to the sidewise swaying or wrenching of the body. Since holes do not have to be provided in the side beams or members of the metal frame for the body securing bolts, the position of the bolts is not restricted by reason of the construction of the frame or the parts mounted thereon, and the bolts can be located at the most convenient or suitable points for securing the body to the frame, the bolts being located differently in securing bodies of different constructions, if this is found to be necessary.

I claim as my invention:

1. The combination with a vehicle frame having metal side supporting members with laterally projecting upper flanges, of means for securing a body, platform or the like on said frame comprising attaching sills which extend lengthwise of and are supported on the upper flanges of said frame members, securing devices for said sills which are rigidly secured to said sills and are rigidly secured to said frame members below the upper flanges thereof, and fastening devices for said body which are attached to said sills only, said body being complete independently of said sills.

2. The combination with a vehicle frame having metal beam side members provided with vertical webs and upper laterally projecting flanges, of means for securing a body, platform or the like on said frame comprising attaching sills for the vehicle body extending lengthwise of and supported on said flanged frame members, and securing brackets for said sills which are secured to the vertical webs of said frame members below the flanges thereof and have portions which embrace and are bolted to said sills and portions which embrace said flanged frame members for rigidly securing said sills independently to said frame members, said sills having provision for rigidly securing the body thereon.

Witness my hand, this 18th day of April, 1911.

HUGH KERR THOMAS.

Witnesses:
WILLIAM H. LOCKE,
WM. J. THOMPSON.